(12) United States Patent
Stockburger, Jr.

(10) Patent No.: US 6,626,367 B1
(45) Date of Patent: Sep. 30, 2003

(54) IRRIGATION SYSTEM

(76) Inventor: George Richard Stockburger, Jr., 3866-71st St. E., Inver Grove Heights, MN (US) 55076

(*) Notice: Subject to any disclaimer, the term of this patent is extended or adjusted under 35 U.S.C. 154(b) by 0 days.

(21) Appl. No.: 10/153,352

(22) Filed: May 24, 2002

(51) Int. Cl.[7] .............................................. B05B 17/00
(52) U.S. Cl. ............................. 239/1; 239/67; 239/69; 239/200; 239/201; 239/DIG. 15
(58) Field of Search ........................... 239/67, 69, 200, 239/201, DIG. 15, 1

(56) References Cited

U.S. PATENT DOCUMENTS

| | | | | |
|---|---|---|---|---|
| 3,521,130 A | * | 7/1970 | Davis et al. ................. | 307/154 |
| 3,578,245 A | * | 5/1971 | Brock ......................... | 239/69 |
| 3,761,945 A | * | 9/1973 | Engle ......................... | 340/2.5 |
| 5,921,280 A | * | 7/1999 | Ericksen et al. .............. | 239/69 |
| 6,286,765 B1 | * | 9/2001 | Byles .......................... | 239/200 |

* cited by examiner

Primary Examiner—Robin O. Evans
(74) Attorney, Agent, or Firm—Thomas B. Tate (57) ABSTRACT

An underground irrigation system which has a controller with multiple inputs, that is, more than one common wire. More zones can be irrigated with this system than would be possible using a comparable total number of wires in conventional irrigation systems.

1 Claim, 2 Drawing Sheets

IRRIGATION SYSTEM

BACKGROUND OF THE INVENTION

The field of the invention is irrigation systems.

Underground irrigation systems are used to water lawns and gardens at homes and businesses, as well as larger areas such as parks and golf courses. Systems known in the prior art use a controller which is wired with low-voltage multi-strand wire or multiple single-strand wires which runs through the ground to a series of valve boxes. Each valve box contains valves that are activated by a solenoid. For golf course applications, each solenoid is built into its corresponding valve instead of having several valves in a valve box activated by one solenoid. When the valves are opened, water flows through irrigation pipes to the area (called a zone) of the lawn or garden that is to be irrigated.

The biggest type of multi-strand wire has thirteen strands, and only one of these strands is used as the common input wire in the controller. This limits the number of zones that can be watered. For example, with thirteen-strand wire, one wire is the common wire, leaving twelve wires to each service a zone. Thus the maximum number of zones that can be irrigated using one controller is twelve.

In the prior art, controllers use a separate wire for each zone and have one common wire. Expandable controllers have a base with one common wire and three zone wires, and are expanded by adding as many modules of these zone wires as are needed.

Examples of prior art irrigation systems are disclosed in the following U.S. Patents: U.S. Pat. No. 4,985,638 to Brock, U.S. Pat. No. 5,048,755 to Dodds, and U.S. Pat. No. 5,662,135 to Oppman et al. No known prior art discloses the type of system used in the present invention.

SUMMARY OF THE INVENTION:

The invention is an irrigation system that has more than one common wire (therefore multiple inputs to the controller). A simple example is a controller having five-strand wire. Two of the wires are common wires, while the other three wires are zone wires (also known as field wires), each serving two zones, for a total of six zones. Adding more common wires increases the number of zones; for example, six strands of wire for nine zones, seven strands of wire for twelve zones; this pattern can continue indefinitely.

An advantage of this system is that more zones can be served with fewer wires and connections, since the zone numbers are set with multiple common wires instead of one common wire with multiple zone wires. Especially with a large lawn, this greatly reduces the expense and labor involved in laying the wires for the system.

Figure 1:
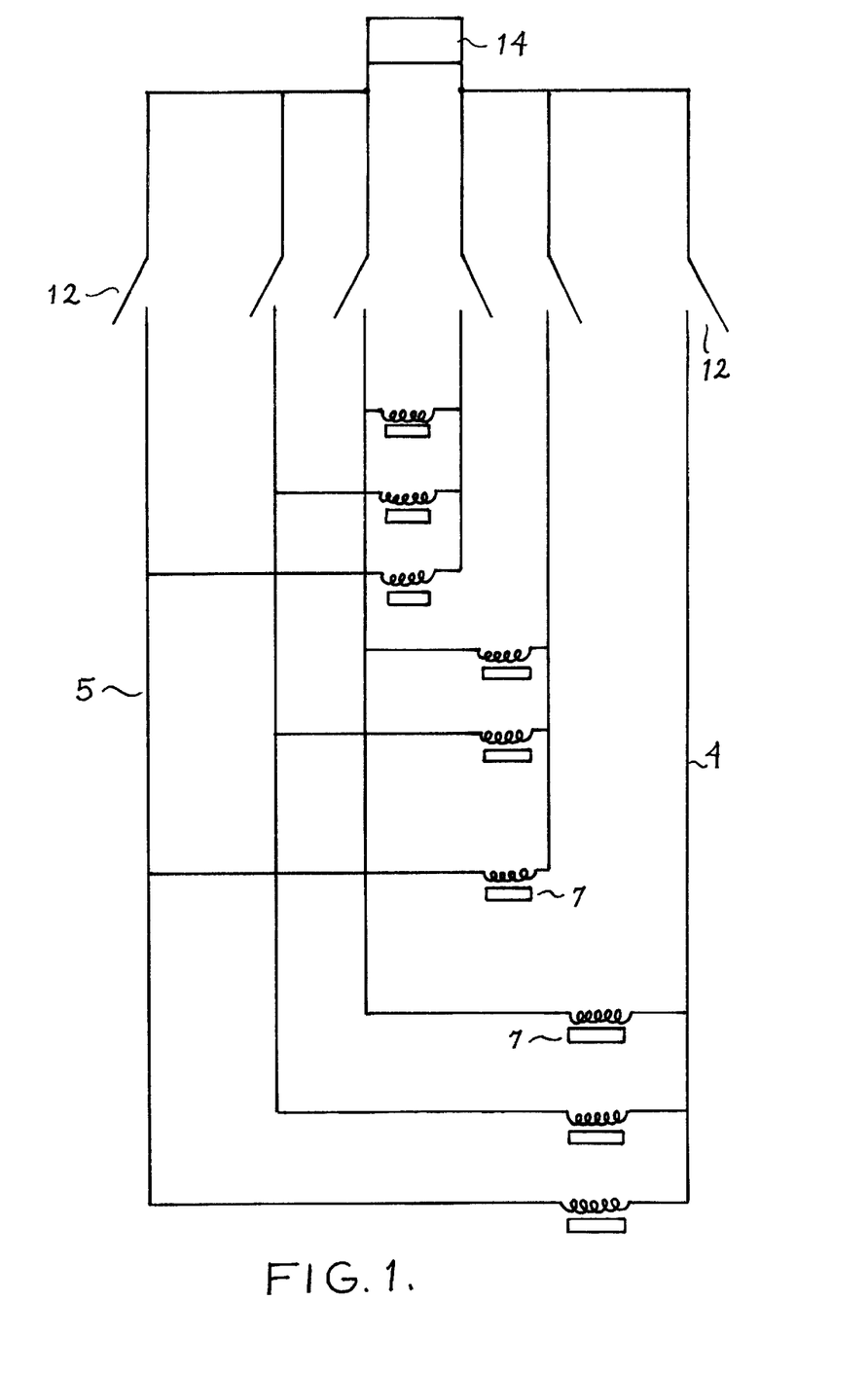
FIG. 1 is a schematic diagram showing the general pattern of the invention.

DETAILED DESCRIPTION OF THE INVENTION:

The general pattern of this type of underground irrigation system is shown in FIG. 1. A controller 3 which has a clock and timer determines the timing of the watering cycle. The controller 3 has switches 12 (preferably electrically controlled, but other types of controls could be used) on both sides. The switches 12 on one side of the controller 3 connect to the common wires 4, and the switches 12 on the opposite side of the controller 3 connect to the zone wires 5. Any number of switches 12 can be used, and correspondingly, any number of common wires 4 and zone wires 5 can be used. The controller 3 can be of any type that has switches on both sides and is able to accept multiple common wires.

The power supply 14 can be any voltage source that can trigger a solenoid. The power supply 14 can be plugged into a conventional outlet. Low voltage direct current is transmitted from the power supply 14 through the controller 3 to the common wires 4 and zone wires 5.

Figure 2:
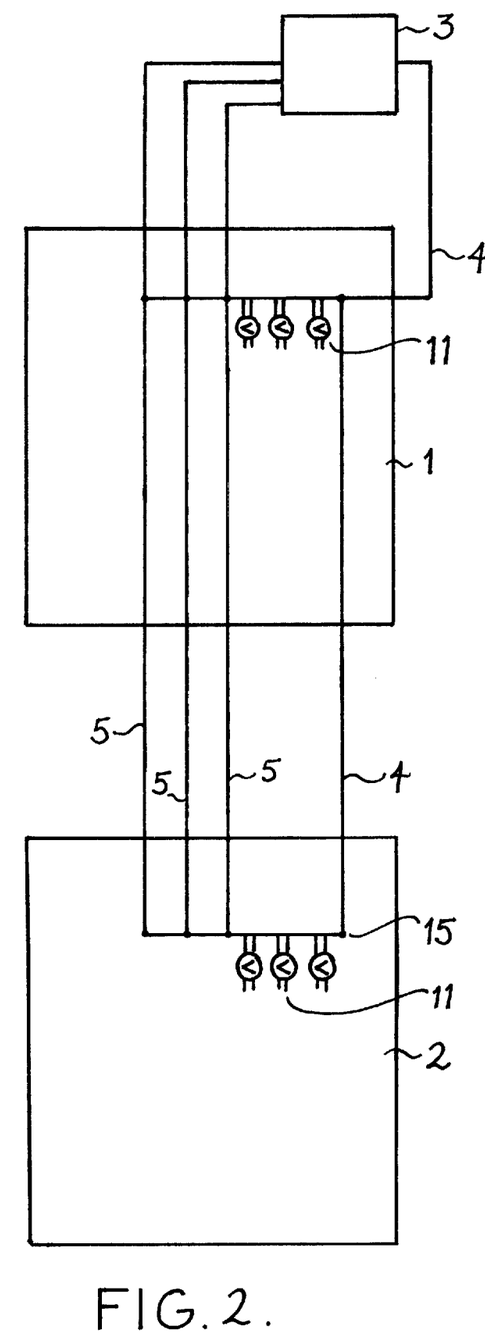
FIG. 2 is a schematic diagram showing, by way of example, the simplest version of the invention.

The field wiring comprises common wires 4 and zone wires 5 which transmit current from the controller 3 to a series of solenoids 7 (any number of solenoids can be used) and valves 11 which are activated by the solenoids 7. Often the wires will be multi-strand wires (but due to distance, single-strand wires are used in many situations); some of the strands are used as common wires 4 and other strands are used as zone wires 5. The solenoids 7 open the valves 11 to allow water to flow through irrigation pipes (not shown). Each wire is connected to a different nut 15 for each zone of the yard to be irrigated. Each solenoid 7 irrigates one zone. Usually there are series of valve boxes (in the example shown in FIG. 2, a first valve box 1 and a second valve box 2), each of which contains one or more (often two to five) valves 11 and a solenoid 7 which activates those valves 11. In the version used for irrigating golf courses or industrial applications which require heavier wire, valve boxes are not used, but instead there is one solenoid 7 threaded or built into the top of each valve 11, and the solenoids 7 and valves 11 are connected directly along the line. In this version, instead of multi-strand wires, an equivalent number of single-strand wires are used. For example, if six-strand wire would be used in a typical application, six strands of single-strand wire would be used in the comparable golf course or industrial application.

All versions of the invention have more than one common wire 4, and also have zone wires 5 which each serve at least one zone, and in most cases, serve two or more zones. The zone wires 5 which are a particular color are all on the same line (for example, all greens on the same line, all purples on the same line, et cetera). In the preferred embodiment of the invention, the optimum number of zones which can be watered using a given number of wires (common wires and zone wires) is determined by the formula $Z=(W/2)^2$ where $Z$ is the number of zones and $W$ is the number of wires. If $W$ is an even number, this formula works out exactly. If $W$ is an odd number, $Z$ is rounded off to the nearest whole number. Therefore, six zones can be watered using five wires, nine zones using six wires, twelve zones using seven wires, sixteen zones using eight wires, twenty zones using nine wires, and so on, up to forty-two zones using thirteen wires (the maximum using multi-strand wire presently commercially available). Even more zones may be able to be watered with indefinite amounts of single strands of wire, since this pattern can continue indefinitely.

The following tables illustrate examples of the controller wiring and field wiring of six-zone controllers, nine-zone controllers, and twelve-zone controllers using my new system and comparing these with the wiring of standard controllers known in the prior art. In all cases, it will be readily apparent that my system uses fewer wires to irrigate a given number of zones than the prior art controllers. These tables are presented as examples of the best mode of carrying out my invention and not as limitations. The scope of the invention shall include all equivalents.

Controller Wiring

Standard Six Zone Controller

| Common Wire | ---Connected to---→ | White Wire |
|---|---|---|
| Zone 1 | ---Connected to---→ | Blue Wire |
| 2 | ---Connected to---→ | Red Wire |
| 3 | ---Connected to---→ | Green Wire |
| 4 | ---Connected to---→ | Yellow Wire |
| 5 | ---Connected to---→ | Orange Wire |
| 6 | ---Connected to---→ | Black Wire |

*Needs 7 Strands of Wire

Controller Wiring -continued

New Six Zone Controller

| Common Wire #1 | ---Connected to---→ | White Wire |
|---|---|---|
| Common Wire #2 | ---Connected to---→ | Black Wire |
| Zones 1, 4 | ---Connected to---→ | Blue Wire |
| 2, 5 | ---Connected to---→ | Red Wire |
| 3, 6 | ---Connected to---→ | Green Wire |

*Needs only 5 Strands of Wire

Existing Controller Field Wiring (2 Valve Boxes, 3 Valves w/Solenoids each)

| Controller | 7 Strands of Wire → | Valve Box #1 | | 4 Strands of Wire → | Valve Box #2 | | |
|---|---|---|---|---|---|---|---|
| | | Common Wire | 1 White Wire | Continues → | Common Wire | 1 White Wire | |
| | | Zone 1 | 2 Blue Wire | Blue/White Connected to Solenoid 1 | | | |
| | | Zone 2 | 3 Red Wire | Red/White Connected to Solenoid 2 | | | |
| | | Zone 3 | 4 Green Wire | Green/White Connected to Solenoid 3 | | | |
| | | | 5 Yellow Wire | Continues → | Zone 4 | 2 Yellow Wire | Yellow/White to Solenoid 4 |
| | | | 6 Orange Wire | Continues → | Zone 5 | 3 Orange Wire | Orange/White to Solenoid 5 |
| | | | 7 Black Wire | Continues → | Zone 6 | 4 Black Wire | Black/White to Solenoid 6 |

New Controller Field Wiring (2 Valve Boxes, 3 Valves w/Solenoids)

| Controller | 5 Strands of Wire → | Valve Box #1 | | 4 Strands of Wire → | Valve Box #2 | | |
|---|---|---|---|---|---|---|---|
| | | Common Wire #1 | 1 White Wire | Wire Ends | | | |
| | | Common Wire #2 | 2 Black Wire | Black Continues → | Common Wire #2 | 2 Black Wire | |
| | | Zone 1 | 3 Blue Wire | Blue/White to Solenoid 1 | Blue Continues → | Zone 4 | 3 Blue Wire | Blue/Black to Solenoid 4 |
| | | Zone 2 | 4 Red Wire | Red/White to Solenoid 2 | Red Continues → | Zone 5 | 4 Red Wire | Red/Black to Solenoid 5 |
| | | Zone 3 | 5 Green Wire | Green/White to Solenoid 3 | Green Continues → | Zone 6 | 5 Green Wire | Green/Black to Solenoid 6 |

Existing Controller Field Wiring (2 Valve Boxes, 2 Valves w/Solenoids First Valve Box, 4 Valves w/Solenoids Second Valve Box)

| Controller | 7 Strands of Wire → | Valve Box #1 | | 5 Strands of Wire → | Valve Box #2 | |
|---|---|---|---|---|---|---|
| | | Common Wire | 1 White Wire | White Continues → | Common Wire | 1 White Wire |
| | | Zone 1 | 2 Blue Wire | Blue/White Connected to Solenoid 1 | | |
| | | Zone 2 | 3 Red Wire | Red/White Connected to Solenoid 2 | | |
| | | | 4 Green Wire | Green Continues → | Zone 3 | 2 Green Wire | Green/White to Solenoid 4 |
| | | | 5 Yellow Wire | Yellow Continues → | Zone 4 | 3 Yellow Wire | Yellow/White to Solenoid 4 |
| | | | 6 Orange Wire | Orange Continues → | Zone 5 | 4 Orange Wire | Orange/White to Solenoid 5 |
| | | | 7 Black Wire | Black Continues → | Zone 6 | 5 Black Wire | Black/White to Solenoid 6 |

New Controller Field Wiring (2 Valve Boxes, 2 Valves w/Solenoids First Valve Box, 4 Valves w/Solenoids Second Valve Box)

| Controller | 5 Strands of Wire → | Valve Box #1 | | 5 Strands of Wire → | Valve Box #2 | |
|---|---|---|---|---|---|---|
| | | Common Wire #1 | 1 White Wire | White Continues → | Common Wire #1 | 1 White Wire |
| | | Common Wire #2 | 2 Black Wire | Black Continues → | Common Wire #2 | 2 Black Wire |
| | | Zone 1 | 3 Blue Wire | Blue/White to Solenoid 1 / Blue Continues → | Zone 4 | 3 Blue Wire | Blue/Black to Solenoid 4 |
| | | Zone 2 | 4 Red Wire | Red/White to Solenoid 2 / Red Continues → | Zone 5 | 4 Red Wire | Red/Black to Solenoid 5 |
| | | Zone 3 | 5 Green Wire | Green Continues → | Zone 3, 6 | 5 Green Wire | Green/White Solenoid 3 Green/Black to Solenoid 6 |

Controller Wiring

Standard Nine Zone Controller

| | | |
|---|---|---|
| Common Wire | ---Connected to---→ | White Wire |
| Zone 1 | ---Connected to---→ | Blue Wire |
| 2 | ---Connected to---→ | Orange Wire |
| 3 | ---Connected to---→ | Purple Wire |
| 4 | ---Connected to---→ | Green Wire |
| 5 | ---Connected to---→ | Yellow Wire |
| 6 | ---Connected to---→ | Red Wire |
| 7 | ---Connected to---→ | Black Wire |
| 8 | ---Connected to---→ | Pink Wire |

-continued

Controller Wiring

| | | |
|---|---|---|
| 9 | ---Connected to---→ | Gray Wire |

*Needs 10 Strands of Wire

New Nine Zone Controller

| | | |
|---|---|---|
| Common Wire #1 | ---Connected to---→ | White Wire |
| Common Wire #2 | ---Connected to---→ | Black Wire |
| Common Wire #3 | ---Connected to---→ | Red Wire |
| Zones 1, 4, 7 | ---Connected to---→ | Blue Wire |
| 2, 5, 8 | ---Connected to---→ | Green Wire |
| 3, 6, 9 | ---Connected to---→ | Yellow Wire |

*Needs ONLY 6 Strands of Wire

Existing Controller Field Wiring (3 Valve Boxes, 3 Valves w/Solenoids First Valve Box, 2 Valves w/Solenoids Second Valve Box, 4 Valves w/Solenoids Third Box)

| Controller | Valve Box #1 | | | Valve Box #2 | | | Valve Box #3 | | |
|---|---|---|---|---|---|---|---|---|---|
| 10 Strands of Wire → | | 7 Strands of Wire → | | | 5 Strands of Wire → | | | | |
| | Common Wire | 1 White Wire | White Continues → | Common Wire | 1 White Wire | White Continues → | Common Wire | 1 White Wire | |
| | Zone 1 | 2 Blue Wire | Blue/White To Solenoid 1 | | | | | | |
| | Zone 2 | 3 Orange Wire | Orange/White To Solenoid 2 | | | | | | |
| | Zone 3 | 4 Purple Wire | Purple/White To Solenoid 3 | | | | | | |
| | | 5 Green Wire | Green Continues → | Zone 4 | 5 Green Wire | Green/White To Solenoid 4 | | | |
| | | 6 Yellow Wire | Yellow Continues → | Zone 5 | 6 Yellow Wire | Yellow/White To Solenoid 5 | | | |
| | | 7 Red Wire | Red Continues → | | 7 Red Wire | Red Continues → | Zone 6 | 7 Red Wire | Red/White To Solenoid 6 |
| | | 8 Black Wire | Black Continues → | | 8 Black Wire | Black Continues → | Zone 7 | 8 Black Wire | Black/White To Solenoid 7 |
| | | 9 Pink Wire | Pink Continues → | | 9 Pink Wire | Pink Continues → | Zone 8 | 9 Pink Wire | Pink/White To Solenoid 8 |
| | | 10 Gray Wire | Gray Continues → | | 10 Gray Wire | Gray Continues → | Zone 9 | 10 Gray Wire | Gray/White To Solenoid 9 |

New Controller Field Wiring (3 Valve Boxes, 3 Valves w/ Solenoids First Valve Box, 2 Valves w/Solenoids Second Valve Box, 4 Valves w/ Solenoids Third Box)

| Controller | Valve Box #1 | 5 Strands of Wire → | Valve Box #2 | 5 Strands of Wire → | Valve Box #3 |
|---|---|---|---|---|---|
| 6 Strands of Wire ↑ | Common Wire #1 | 1 White Wire | White Ends | | |
| | Common Wire #2 | 2 Black Wire | Black Continues ↑ | Common Wire #2 | 2 Black Wire | Black Continues ↑ | Common Wire #2 | 2 Black Wire |
| | Common Wire #3 | 3 Red Wire | Red Continues ↑ | Common Wire #3 | 3 Red Wire | Red Continues ↑ | Common Wire #3 | 3 Red Wire |
| | Zone 1 | 4 Blue Wire | Blue/White To Solenoid 1 | Blue Continues ↑ | Zone 4 | 4 Blue Wire | Blue/Black To Solenoid 4 | Blue Continues ↑ | Zone 7 | 4 Blue Wire | Blue/Red To Solenoid 7 |
| | Zone 2 | 5 Green Wire | Green/White To Solenoid 2 | Green Continues ↑ | Zone 5 | 5 Green Wire | Green/Black To Solenoid 5 | Green Continues ↑ | Zone 8 | 5 Green Wire | Green/Red To Solenoid 8 |
| | Zone 3 | 6 Yellow Wire | Yellow/White To Solenoid 3 | Yellow Continues ↑ | 6 Yellow Wire | Yellow Continues ↑ | Zone 6, 9 | 6 Yellow Wire | Yellow/Black To Solenoid 6 / Yellow/Red To Solenoid 9 |

| Controller Wiring | | |
|---|---|---|
| Twelve Zone Controller | | |
| Common Wire | ---Connected to---→ | White Wire |
| Zone 1 | ---Connected to---→ | Yellow Wire |
| 2 | ---Connected to---→ | Blue Wire |
| 3 | ---Connected to---→ | Dk. Green Wire |
| 4 | ---Connected to---→ | Red Wire |
| 5 | ---Connected to---→ | Orange Wire |
| 6 | ---Connected to---→ | Purple Wire |
| 7 | ---Connected to---→ | Pink Wire |
| 8 | ---Connected to---→ | Tan Wire |
| 9 | ---Connected to---→ | Gray Wire |
| 10 | ---Connected to---→ | Lt. Green Wire |

-continued

| Controller Wiring | | |
|---|---|---|
| 11 | ---Connected to---→ | Black Wire |
| 12 | ---Connected to---→ | Brown Wire |
| *Needs 13 Strands of Wire | | |
| New Twelve Zone Controller | | |
| Zones 1, 4, 7, 10 | ---Connected to---→ | Blue Wire |
| Zones 2, 5, 8, 11 | ---Connected to---→ | Green Wire |
| Zones 3, 6, 9, 12 | ---Connected to---→ | Yellow Wire |
| Common Wire #1 | ---Connected to---→ | White Wire |
| Common Wire #2 | ---Connected to---→ | Black Wire |
| Common Wire #3 | ---Connected to---→ | Red Wire |
| Common Wire #4 | ---Connected to---→ | Brown Wire |

*Needs ONLY 7 Strands of Wire

Existing Controller Field Wiring (3 Valve Boxes, 3 Valves w/ Solenoids First Valve Box, 4 Valves w/Solenoids Second Valve Box, 5 Valves w/ Solenoids Third Box)

| Controller | Valve Box #1 | 10 Strands of Wire → | | Valve Box #2 | 6 Strands of Wire → | | Valve Box #3 | |
|---|---|---|---|---|---|---|---|---|
| 13 Strands of Wire → | Common Wire | 1 White Wire | White Continues → | Common Wire | 1 White Wire | White Continues → | Common Wire | 1 White Wire |
| | Zone 1 | 2 Yellow Wire | Yellow/White To Solenoid 1 | | | | | |
| | Zone 2 | 3 Blue Wire | Blue/White To Solenoid 2 | | | | | |
| | Zone 3 | 4 Dk. Green | Dk. Green/White To Solenoid 3 | | | | | |
| | | 5 Red Wire | Red Continues → | Zone 4 | 5 Red Wire | Red/White To Solenoid 4 | | |
| | | 6 Orange Wire | Orange Continues → | Zone 5 | 6 Orange Wire | Orange/White To Solenoid 5 | | |
| | | 7 Purple Wire | Purple Continues → | Zone 6 | 7 Purple Wire | Purple/White To Solenoid 6 | | |
| | | 8 Pink Wire | Pink Continues → | Zone 7 | 8 Pink Wire | Pink/White To Solenoid 7 | | |
| | | 9 Tan Wire | Tan Continues → | | 9 Tan Wire | Tan Continues → | Zone 8 | 9 Tan Wire | Tan/White To Solenoid 8 |
| | | 10 Gray Wire | Gray Continues → | | 10 Gray Wire | Gray Continues → | Zone 9 | 10 Gray Wire | Gray/White To Solenoid 9 |
| | | 11 Lt. Green | Lt. Green Continues → | | 11 Lt. Green | Lt. Green Continues → | Zone 10 | 11 Lt. Green | Lt. Green/White To Solenoid 10 |
| | | 12 Black Wire | Black Continues → | | 12 Black Wire | Black Continues → | Zone 11 | 12 Black Wire | Black/White To Solenoid 11 |
| | | 13 Brown Wire | Brown Continues → | | 13 Brown Wire | Brown Continues → | Zone 12 | 13 Brown Wire | Brown/White To Solenoid 12 |

New Controller Field Wiring (3 Valve Boxes, 3 Valves w/ Solenoids First Valve Box, 4 Valves w/Solenoids Second Valve Box, 5 Valves w/ Solenoids Third Box)

| Controller | Valve Box #1 | 6 Strands of Wire | | Valve Box #2 | 5 Strands of Wire | | Valve Box #3 | |
|---|---|---|---|---|---|---|---|---|
| 7 Strands of Wire | | | | | | | | |
| | Common Wire #1 | 1 White Wire | 1 White Ends | | | | | |
| | Common Wire #2 | 2 Black Wire | Black Continues → | Common Wire #2 | 2 Black Wire | Black Ends | | |
| | Common Wire #3 | 3 Red Wire | Red Continues → | Common Wire #3 | 3 Red Wire | Red Continues → | Common Wire #3 | 3 Red Wire |
| | Common Wire #4 | 4 Brown Wire | Brown Continues → | Common Wire #4 | 4 Brown Wire | Brown Continues → | Common Wire #4 | 4 Brown Wire |
| | Zone 1 | 5 Blue Wire | Blue/White To Solenoid 1; Blue Continues → | Zone 4, 7 | 5 Blue Wire | Blue/Black To Solenoid 4; Blue/Red To Solenoid 7; Blue Continues → | Zone 10 | 5 Blue Wire; Blue/Brown To Solenoid 10 |
| | Zone 2 | 6 Green Wire | Green/White To Solenoid 2; Green Continues → | Zone 5 | 6 Green Wire | Green/Black To Solenoid 5; Green Continues → | Zone 8, 11 | 6 Green Wire; Green/Red To Solenoid 8; Green/Brown To Solenoid 11 |
| | Zone 3 | 7 Yellow Wire | Yellow/White To Solenoid 3; Yellow Continues → | Zone 6 | 7 Yellow Wire | Yellow/Black To Solenoid 6; Yellow Continues → | Zone 9, 12 | 7 Yellow Wire; Yellow/Red To Solenoid 9; Yellow/Brown To Solenoid 12 |

I claim:

1. In an irrigation system comprising a controller, valves, solenoids which activate said valves, and multiple strands of wire connecting said controller to said solenoids, a method of wiring said irrigation system comprising the following steps:

calculating the optimum number of zones which can be irrigated using a given number of wires by using the formula $Z=(W/2)^2$ where Z is the number of zones, said number of zones being at least six, and W is the number of wires;

connecting said controllers to said solenoids by means of multiple strands of wire in accordance with said formula, wherein said multiple strands of wire include two or more common wires which serve as multiple inputs to said controller, and also include a plurality of zone wires which activate said solenoids in order to irrigate at least one zone per each zone wire.

* * * * *